(12) United States Patent
Gambino

(10) Patent No.: US 11,376,677 B2
(45) Date of Patent: Jul. 5, 2022

(54) TUBE NOTCHING DEVICES

(71) Applicant: Rogue Fabrication, LLC, Sandy, OR (US)

(72) Inventor: Joseph Gambino, Sandy, OR (US)

( * ) Notice: Subject to any disclaimer, the term of this patent is extended or adjusted under 35 U.S.C. 154(b) by 80 days.

(21) Appl. No.: 17/028,233

(22) Filed: Sep. 22, 2020

(65) Prior Publication Data

US 2022/0088688 A1    Mar. 24, 2022

(51) Int. Cl.
*B23D 21/02* (2006.01)
*B23D 33/02* (2006.01)
*B23B 47/28* (2006.01)

(52) U.S. Cl.
CPC ............. *B23D 21/02* (2013.01); *B23D 33/02* (2013.01); *B23B 47/281* (2013.01)

(58) Field of Classification Search
CPC ..... B23B 47/28; B23B 47/281; B23D 21/006; B23D 21/02; B23D 21/04; B23D 21/06; B23D 21/10; B23D 33/02; B26D 3/14; B26D 2007/013; B26D 3/162; B26D 3/166; B26D 3/169
See application file for complete search history.

(56) References Cited

U.S. PATENT DOCUMENTS

| | | | | |
|---|---|---|---|---|
| 4,152,090 A | * | 5/1979 | Harris | B23B 47/281 408/104 |
| 5,118,228 A | * | 6/1992 | Story | B23B 41/00 408/115 R |
| 7,607,870 B2 | * | 10/2009 | Hughes, Jr. | B23B 47/281 408/110 |
| 8,152,419 B1 | * | 4/2012 | Snyder | B23B 47/281 408/110 |
| 8,616,811 B2 | * | 12/2013 | Clark, II | E21B 17/01 408/101 |
| 8,734,066 B2 | * | 5/2014 | Rusch | B23B 47/281 279/107 |
| 2009/0022559 A1 | * | 1/2009 | Hughes, Jr. | B25H 1/00 408/103 |

\* cited by examiner

*Primary Examiner* — Evan H MacFarlane

(57) ABSTRACT

A tube notching device for forming a notch in a tubular workpiece. The tube notching device includes a support frame, a vise, a positioning assembly, a cutting assembly, and a cutting mechanism. The vise is mounted to the support frame and secures the tubular workpiece in a desired support position. The positioning assembly is pivotally mounted to the support frame. The cutting assembly is pivotally mounted to the positioning assembly. The cutting mechanism is mounted to the cutting assembly and configured to form a notch in the tubular workpiece. The positioning assembly and the cutting assembly cooperate to position the cutting mechanism in a desired notching position relative to the tubular workpiece supported in the vise in the desired support position. The cutting mechanism operates to form a desired notch in the tubular workpiece when the cutting mechanism is in the desired notching position.

16 Claims, 7 Drawing Sheets

TUBE NOTCHING DEVICES

BACKGROUND

The present disclosure relates generally to workpiece processing devices. In particular, tube notching devices are described.

Forming notches in workpieces is useful for a variety of purposes and applications. For example, forming notches in a workpiece can enable coping round tubes or pipes together. Coping tubular workpieces together is useful to build various items, including roll cages, handrails, furniture, and gates. Tube notching devices are often employed to form notches in workpieces.

Known tube notching devices are not entirely satisfactory for the range of applications in which they are employed. For example, existing tube notching devices provide limited abilities to position the cutting tool relative to the workpiece. Conventional tube notching devices allow for translating the cutting tool relative to the workpiece, but do not also allow for the cutting tool to be pivoted relative to the workpiece. The effectiveness of existing tube notching devices is limited by their inability to both translate and pivot the cutting tool relative to the workpiece. Conventional tube notching devices require the cutting tool to be kept farther from the bearing block, which reduces safety, operator comfort, and cutting bit life.

Another limitation of conventional tube notching devices relates to their stability. Certain tube notching devices have only a single pivot, which often results in the cutting tool deviating from a desired orientation relative to the workpiece as the tool is used. It would be desirable to have the cutting tool held in a desired orientation more rigidly and securely. In particular, it would be advantageous to have a second pivot that can secure the cutting tool in a desired orientation in cooperation with a first pivot. To further enhance the rigidity and stability of the tube notching device, it would be beneficial to position the first and second pivots outside the cutting area.

Thus, there exists a need for tube notching devices that improve upon and advance the design of known tube notching devices. Examples of new and useful tube notching devices relevant to the needs existing in the field are discussed below.

United States patent filings with disclosure relevant to tube notching devices include U.S. Pat. Nos. 7,284,406, 8,403,926, 4,266,457, 10,661,376, 7,607,870, 10,245,653, and 8,734,066. The complete disclosures of the above patents and patent applications are herein incorporated by reference for all purposes.

SUMMARY

The present disclosure is directed to a tube notching device for forming a notch in a tubular workpiece. The tube notching devices includes a support frame, a vise, a positioning assembly, a cutting assembly, and a cutting mechanism. The vise is mounted to the support frame and secures the tubular workpiece in a desired support position. The positioning assembly is pivotally mounted to the support frame. The cutting assembly is pivotally mounted to the positioning assembly. The cutting mechanism is mounted to the cutting assembly and configured to form a notch in the tubular workpiece. The positioning assembly and the cutting assembly cooperate to position the cutting mechanism in a desired notching position relative to the tubular workpiece supported in the vise in the desired support position. The cutting mechanism operates to form a desired notch in the tubular workpiece when the cutting mechanism is in the desired notching position.

DETAILED DESCRIPTION

Figure 1:
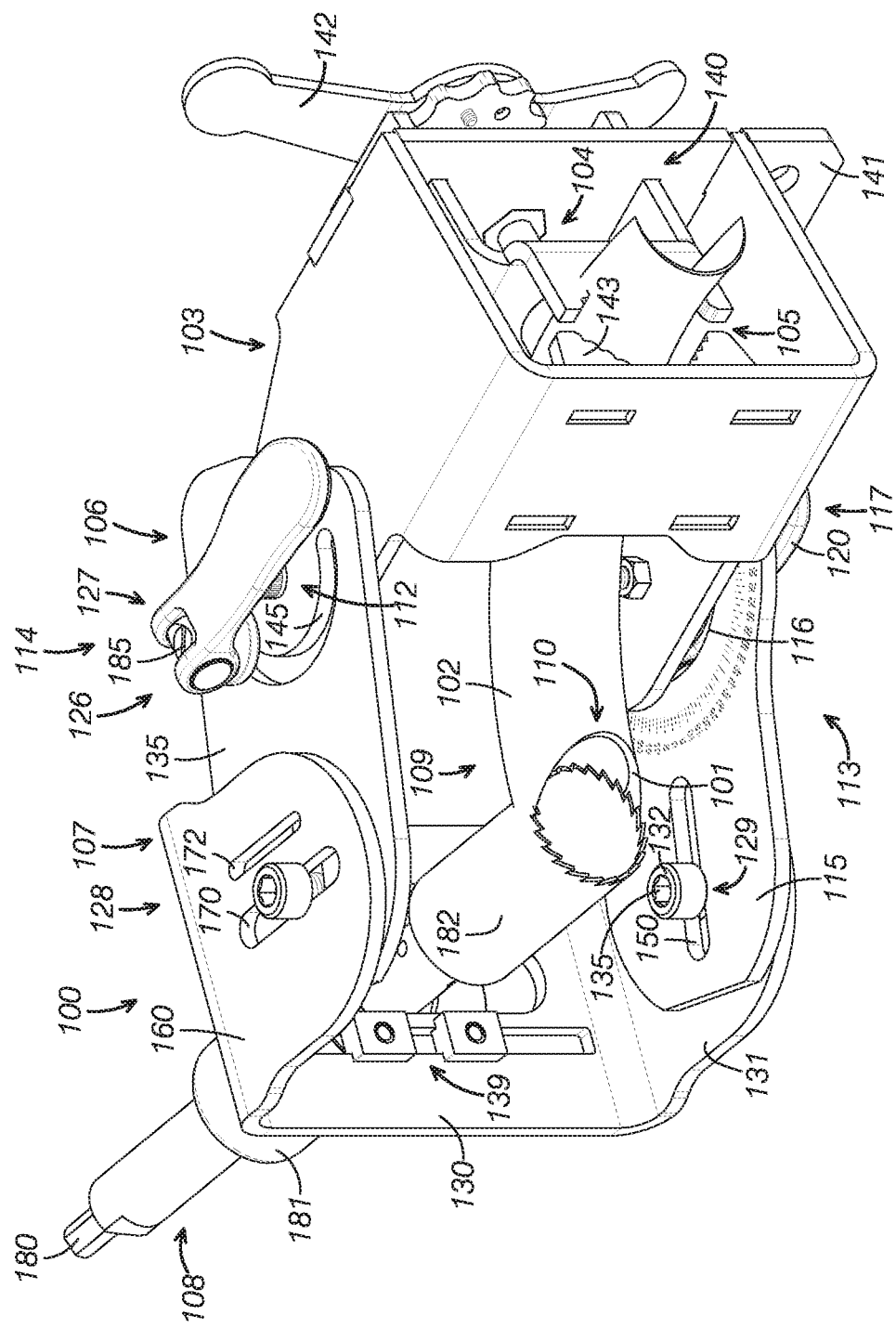
FIG. 1 is a perspective view of a first embodiment of a tube notching device forming a notch in a tubular workpiece.

The disclosed tube notching devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various tube notching devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Tube Notching Devices

With reference to the figures, tube notching devices will now be described. The tube notching devices discussed herein function to form notches in workpieces, including tubular workpieces. Additionally or alternatively to tubular workpieces, the tube notching devices are configured to form notches in bars, rods, plates, and structural members.

The reader will appreciate from the figures and description below that the presently disclosed tube notching devices address many of the shortcomings of conventional tube notching devices. For example, the tube notching devices described herein provide increased capabilities to position the cutting tool relative to the workpiece. In addition to allowing for the cutting tool to be translated relative to the workpiece, the present tube notching devices also allow for the cutting tool to be pivoted relative to the workpiece. The notching effectiveness of the tube notching devices described in this document is increased by their ability to both translate and pivot the cutting tool relative to the workpiece. Advantageously, the tube notching devices described herein allow the cutting tool to be kept closer to the bearing block, which increases safety, operator comfort, and cutting bit life.

The present tube notching devices are more stable than conventional tube notching devices. The tube notching devices described herein include two pivots to reduce or eliminate the cutting tool deviating from a desired orientation relative to the workpiece as the tool is used. Improving over existing tube notching devices, the present tube notching devices hold the cutting tool in a desired orientation more rigidly and securely. In particular, they include a second pivot that can secure the cutting tool in a desired orientation in cooperation with a first pivot. Further enhancing the rigidity and stability of the tube notching devices over conventional devices, the first and second pivots are disposed outside the cutting area.

Contextual Details

Ancillary features relevant to the tube notching devices described herein will first be described to provide context and to aid the discussion of the tube notching devices.

Workpiece

The workpiece on which the tube notching devices described herein may work may be any workpiece suitable for being held in place and cut with a cutting mechanism. In the examples shown in the figures, the workpiece is tubular to define a tubular workpiece 102. Additionally or alternatively to tubular workpieces, the workpiece may be a bar, rod, plate, or structural member.

Desired Notch

The tube notching devices described herein function to form a desired notch in a workpiece. The size, shape, and orientation of the desired notch may be adapted to be different than the specific examples shown in the figures to suit a given application. The desired notch may be any size, shape, and orientation that can be formed by a cutting mechanism. In some examples, multiple notches are formed in a workpiece.

Tube Notching Device

With reference to FIGS. 1-4, a tube notching device 100 will now be described as a first example of a tube notching device. As shown in FIGS. 1-4, tube notching device 100 is configured to form a notch 101 in a tubular workpiece 102.

The reader can see in FIGS. 1-4 that tube notching device 100 includes a support frame 103, a vise 104, a positioning assembly 106, a cutting assembly 107, and a cutting mechanism 108. In other examples, the tube notching device includes fewer components than depicted in the figures. In certain examples, the tube notching device includes additional or alternative components than depicted in the figures.

The size of the tube notching device may be varied as needed for a given application. In some examples, the tube notching device is larger relative to the other components than depicted in the figures. In other examples, the tube notching device is smaller relative to the other components than depicted in the figures. Further, the readers should understand that the tube notching device and the other components may all be larger or smaller than described herein while maintaining their relative proportions.

Support Frame

Figure 2:
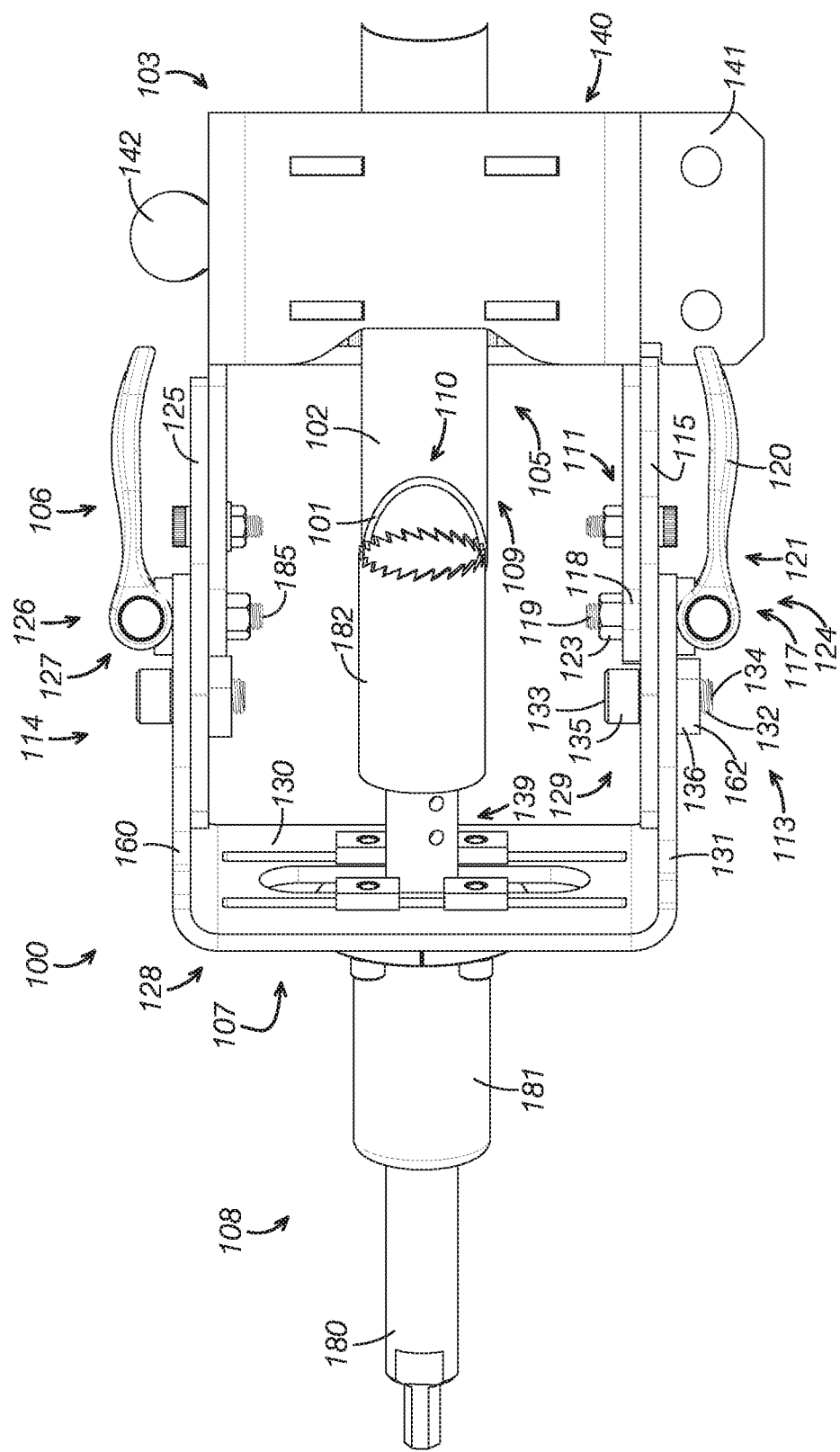
FIG. 2 is a front elevation view of the tube notching device shown in FIG. 1.
Figure 3:
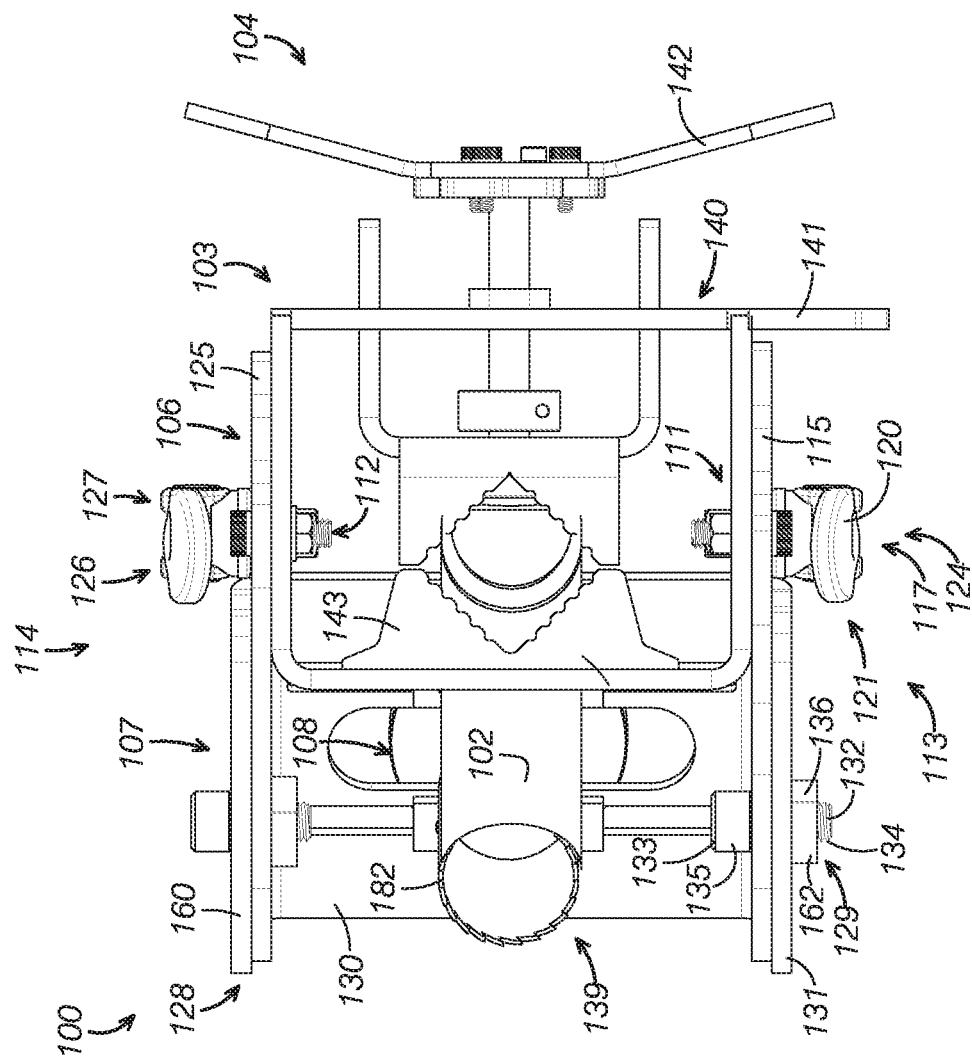
FIG. 3 is a side elevation view of the tube notching device shown in FIG. 1.

Support frame 103 functions to support other components of tube notching device 100, including vise 104 and positioning assembly 106. As depicted in FIGS. 2 and 3, support frame 103 includes a first port 118 complementarily aligned with a curved channel 116 formed in a first pivot plate 115 of positioning assembly 106. First port 118 is configured to receive a shaft 119 of a first pivot lock mechanism 117.

As shown in FIGS. 1-4, support frame 103 defines a box frame 140 with openings through which tubular workpiece 102 may extend. However, the shape of the support frame may be adapted to be different than the specific examples shown in the figures to suit a given application. For example, the support frame may include a face having the shape of a regular or irregular polygon, such as a circle, oval, triangle, square, rectangle pentagon, and the like. Additionally or alternatively, the support frame may include a face having an irregular shape. In three dimensions, the shape of the support frame may be a sphere, a pyramid, a cone, a cube, and variations thereof, such as a hemisphere or a frusto-conical shape.

The reader can see in FIGS. 1-4 that support frame 103 includes a bracket 141 extending from box frame 140. Bracket 141 functions to secure tube notching device 100 to a wall or external frame by extending fasteners through openings defined in bracket 141.

The size of the support frame may be varied as needed for a given application. In some examples, the support frame is larger relative to the other components than depicted in the figures. In other examples, the support frame is smaller relative to the other components than depicted in the figures. Further, the readers should understand that the support frame and the other components may all be larger or smaller than described herein while maintaining their relative proportions.

In the present example support frame 103 is composed of metal. However, the support frame may be composed of any currently known or later developed material suitable for the applications described herein for which it is used. Suitable materials include metals, polymers, ceramics, wood, and composite materials.

The support frame may be any currently known or later developed type of support frame. The reader will appreciate that a variety of support frame types exist and could be used in place of the support frame shown in the figures. In addition to the types of support frames existing currently, it is contemplated that the tube notching device described herein could incorporate new types of support frames developed in the future.

Vise

Vise 104 serves to securely hold tubular workpiece 102 in position as cutting mechanism 108 forms notch 101 in tubular workpiece 102. As depicted in FIGS. 1-3, vise 104 is mounted to support frame 103 and is configured to selectively secure tubular workpiece 102 in a desired support position 105.

As can be seen in FIGS. 1 and 3, vise 104 includes a handle 142 and jaws 143. Jaws 143 selectively grab onto and compress tubular workpiece 102 between them to secure tubular workpiece 102 in position. Rotating handle 142 selectively clamps and releases jaws 143 around tubular workpiece 102.

The shape of the vise may be adapted to be different than the specific examples shown in the figures to suit a given application. The vise may be any currently known or later developed type of vise. The reader will appreciate that a variety of vise types exist and could be used in place of the vise shown in the figures. In addition to the types of vises existing currently, it is contemplated that the tube notching device described herein could incorporate new types of vises developed in the future.

In the present example vise 104 is composed of metal. However, the vise may be composed of any currently known or later developed material suitable for the applications described herein for which it is used. Suitable materials include metals, polymers, ceramics, wood, and composite materials.

The size of the vise may be varied as needed for a given application. In some examples, the vise is larger relative to the other components than depicted in the figures. In other examples, the vise is smaller relative to the other components than depicted in the figures. Further, the readers should understand that the vise and the other components may all be larger or smaller than described herein while maintaining their relative proportions.

Positioning Assembly

As shown in FIGS. 1-4, positioning assembly 106 and cutting assembly 107 cooperate to position cutting mechanism 108 in a desired notching position 109 relative to tubular workpiece 102. Desired notching position 109 is typically relative to tubular workpiece 102 when it is supported in vise 104 in desired support position 105.

With reference to FIGS. 1-4, the reader can see that positioning assembly 106 includes a first pivot plate 115 on a first side 113 of vice 104. Further, the reader can see in FIGS. 1-3 that positioning assembly 106 includes second pivot plate 125 disposed on a second side 114 of vise 104. In the present example, first pivot plate 115 and second pivot plate 125 are oriented substantially parallel to each other.

With reference to FIGS. 1-4, the reader can see that positioning assembly 106 is pivotally mounted to support frame 103. The reader can see in FIGS. 1 and 4 that positioning assembly 106 includes a first pivot 111 and a second pivot 112. First pivot 111 and second pivot 112 enable first pivot plate 115 and second pivot plate 125, respectively, to pivot relative to support frame 103.

Figure 4:
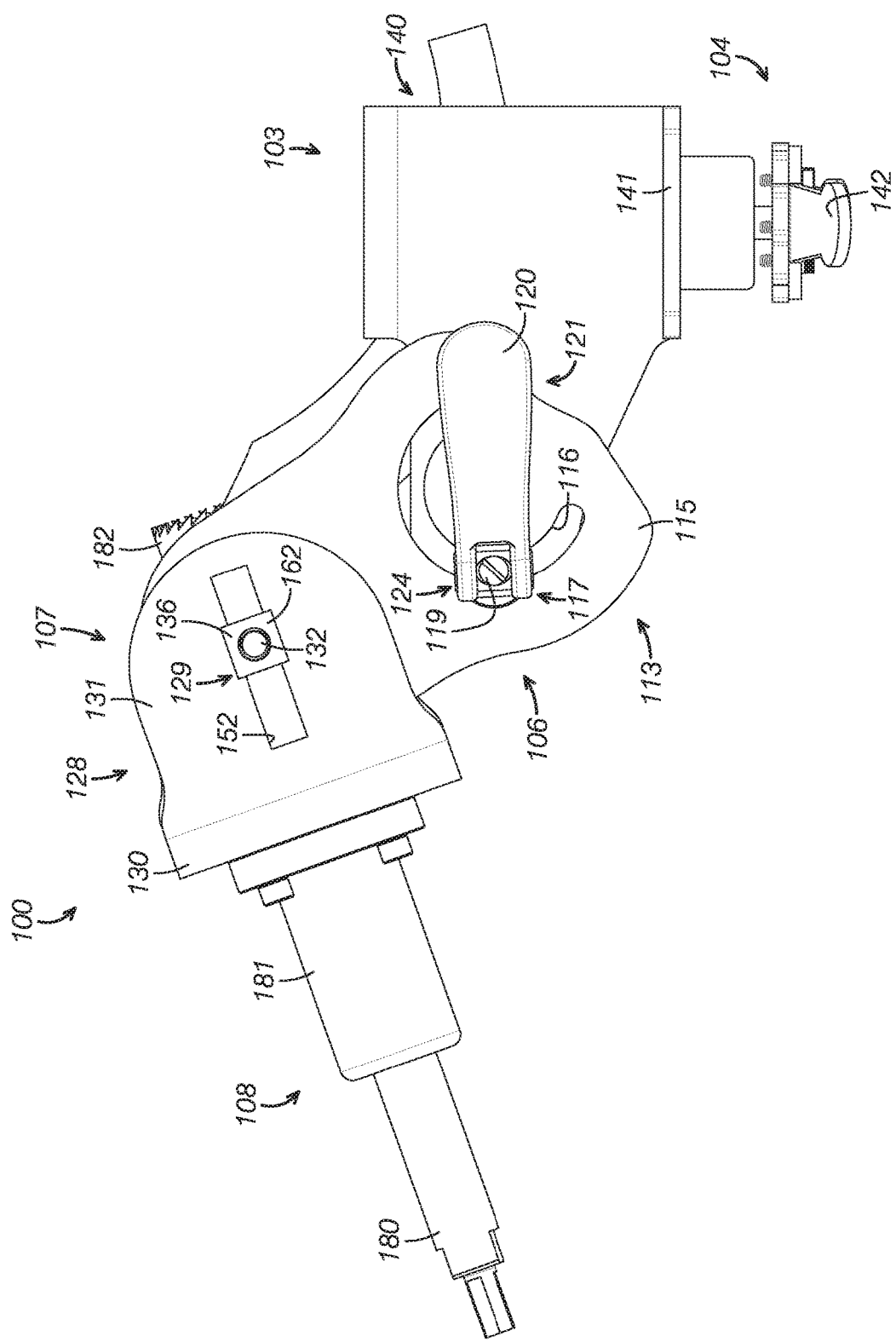
FIG. 4 is a bottom plan view of the tube notching device shown in FIG. 1.

As depicted in FIGS. 2-4, positioning assembly 106 includes a first pivot lock mechanism 117 slidingly mounted within a curved channel 116 of first pivot plate 115. As shown in FIGS. 1-3, positioning assembly 106 also includes second pivot lock mechanism 126 slidingly mounted within a second curved channel 145 of second pivot plate 125. First pivot lock mechanism 117 is configured to selectively restrict first pivot plate 115 from pivoting relative to support frame 103 around first pivot 111. Second pivot lock mechanism 126 is configured to selectively restrict second pivot plate 125 from pivoting relative to support frame 103 around second pivot 112.

The positioning assembly may be any currently known or later developed type of positioning assembly. The reader will appreciate that a variety of positioning assembly types exist and could be used in place of the positioning assembly shown in the figures. In addition to the types of positioning assemblies existing currently, it is contemplated that the tube notching device described herein could incorporate new types of positioning assemblies developed in the future.

The shape of the positioning assembly may be adapted to be different than the specific examples shown in the figures to suit a given application. For example, the positioning assembly may include a face having the shape of a regular or irregular polygon, such as a circle, oval, triangle, square, rectangle pentagon, and the like. Additionally or alternatively, the positioning assembly may include a face having an irregular shape. In three dimensions, the shape of the positioning assembly may be a sphere, a pyramid, a cone, a cube, and variations thereof, such as a hemisphere or a frusto-conical shape.

In the present example positioning assembly 106 is composed of metal. However, the positioning assembly may be composed of any currently known or later developed material suitable for the applications described herein for which it is used. Suitable materials include metals, polymers, ceramics, wood, and composite materials.

The size of the positioning assembly may be varied as needed for a given application. In some examples, the positioning assembly is larger relative to the other components than depicted in the figures. In other examples, the positioning assembly is smaller relative to the other components than depicted in the figures. Further, the readers should understand that the positioning assembly and the other components may all be larger or smaller than described herein while maintaining their relative proportions.

First Pivot Plate

First pivot plate 115 serves to support first pivot lock mechanism 117 and, in conjunction with second pivot plate 125, to link support frame 103 with cutting assembly 107.

With reference to FIG. 4, the reader can see that first pivot plate 115 defines a curved channel 116 extending partially around first pivot 111. As shown in FIG. 1, first pivot plate 115 defines a longitudinal pivot plate channel 150 complementarily configured with a longitudinal arm channel 152 of cutting assembly 107. As can be seen in FIGS. 1 and 4, curved channel 116 and longitudinal pivot plate channel 150 are disposed on opposite ends of first pivot plate 115.

The size of the first pivot plate may be varied as needed for a given application. In some examples, the first pivot plate is larger relative to the other components than depicted in the figures. In other examples, the first pivot plate is smaller relative to the other components than depicted in the figures. Further, the readers should understand that the first pivot plate and the other components may all be larger or smaller than described herein while maintaining their relative proportions.

The shape of the first pivot plate may be adapted to be different than the specific examples shown in the figures to suit a given application. For example, the first pivot plate may include a face having the shape of a regular or irregular polygon, such as a circle, oval, triangle, square, rectangle pentagon, and the like. Additionally or alternatively, the first pivot plate may include a face having an irregular shape. In three dimensions, the shape of the first pivot plate may be a sphere, a pyramid, a cone, a cube, and variations thereof, such as a hemisphere or a frusto-conical shape.

The first pivot plate may be any currently known or later developed type of first pivot plate. The reader will appreciate that a variety of first pivot plate types exist and could be used in place of the first pivot plate shown in the figures. In addition to the types of first pivot plates existing currently, it is contemplated that the tube notching device described herein could incorporate new types of first pivot plates developed in the future.

In the present example first pivot plate 115 is composed of metal. However, the first pivot plate may be composed of any currently known or later developed material suitable for the applications described herein for which it is used. Suitable materials include metals, polymers, ceramics, wood, and composite materials.

Pivots

The role of first pivot 111 is to enable first pivot plate 115 to pivot relative to support frame 103. With reference to FIGS. 1 and 4, the reader can see that first pivot 111 pivotally couples positioning assembly 106 to support frame 103. As shown in FIGS. 1-3, first pivot 111 is disposed on a first side 113 of vise 104.

Second pivot 112 functions to enable second pivot plate 125 to pivot relative to support frame 103. As shown in FIGS. 1 and 4, second pivot 112 pivotally couples positioning assembly 106 to support frame 103. The reader can see in FIGS. 1-3 that second pivot 112 is disposed on a second side 114 of vise 104 opposite first side 113 of vise 104.

The size of the pivots may be varied as needed for a given application. In some examples, the pivots are larger relative to the other components than depicted in the figures. In other examples, the pivots are smaller relative to the other components than depicted in the figures. Further, the readers should understand that the pivots and the other components may all be larger or smaller than described herein while maintaining their relative proportions.

In the present example, first pivot 111 and second pivot 112 are shoulder bolts with brass flange bearings. However, the pivots may be any currently known or later developed type of pivot. The reader will appreciate that a variety of pivot types exist and could be used in place of the first pivot shown in the figures. In addition to the types of pivots existing currently, it is contemplated that the tube notching devices described herein could incorporate new types of pivots developed in the future.

Pivot Lock Mechanisms

As depicted in FIGS. 2-4, first pivot lock mechanism 117 is configured to selectively restrict first pivot plate 115 from pivoting relative to support frame 103 around first pivot 111. With reference to FIGS. 2-4, first pivot lock mechanism 117 includes a shaft 119, a restriction member 120, and a nut 123.

The role of second pivot lock mechanism 126 is to selectively pull or push a second shaft 185 through curved channel 145 of second pivot plate 125 and a second port of support frame 103 to selectively restrict and allow, respectively, second pivot plate 125 to pivot relative to support frame 103. The reader can see in FIGS. 1-3 that second pivot lock mechanism 126 is a cam lock 127.

The pivot lock mechanisms may be any currently known or later developed type of pivot lock mechanism. The reader will appreciate that a variety of pivot lock mechanism types exist and could be used in place of the pivot lock mechanisms shown in the figures. In addition to the types of pivot lock mechanisms existing currently, it is contemplated that the tube notching devices described herein could incorporate new types of pivot lock mechanisms developed in the future.

Shaft

Shaft 119 functions to selectively squeeze together or separate first pivot plate 115 and support frame 103 when selectively pulled or pushed, respectively, by restriction member 120. As shown in FIGS. 2-4, shaft 119 extends through curved channel 116 of first pivot plate 115 and first port 118 of support frame 103. The reader can see in FIGS. 2 and 3 that shaft 119 is fixed to support frame 103 by nut 123.

In the present example, shaft 119 is a threaded bolt. However, the shaft may be any currently known or later developed type of shaft. The reader will appreciate that a variety of shaft types exist and could be used in place of the shaft shown in the figures. In addition to the types of shafts existing currently, it is contemplated that the tube notching devices described herein could incorporate new types of shafts developed in the future.

The size of the shaft may be varied as needed for a given application. In some examples, the shaft is larger relative to the other components than depicted in the figures. In other examples, the shaft is smaller relative to the other components than depicted in the figures. Further, the readers should understand that the shaft and the other components may all be larger or smaller than described herein while maintaining their relative proportions.

Restriction Member

Restriction member 120 serves to selectively pull or push shaft 119 through curved channel 116 of first pivot plate 115 and first port 118 of support frame 103 to selectively restrict and allow, respectively, first pivot plate 115 to pivot relative to support frame 103. As depicted in FIGS. 2-4, restriction member 120 is supported on shaft 119 and selectively operable to restrict shaft 119 from sliding in curved channel 116.

With reference to FIGS. 2-4, restriction member 120 includes a cam 121 configured to pull shaft 119 to compress support frame 103 against first pivot plate 115. Those skilled in the art will recognize that restriction member 120 and shaft 119 collectively define a first cam lock 124. Compressing support frame 103 against first pivot plate 115 restricts first pivot plate 115 from pivoting relative to support frame 103 by frictional engagement between support frame 103 and first pivot plate 115.

The restriction member may be any currently known or later developed type of restriction member. The reader will appreciate that a variety of restriction member types exist and could be used in place of the restriction member shown in the figures. In addition to the types of restriction members existing currently, it is contemplated that the tube notching devices described herein could incorporate new types of restriction members developed in the future.

Nut

As depicted in FIGS. 2 and 3, nut 123 restricts shaft 119 from pulling out of first port 118 of support frame 103. The nut may be any currently known or later developed type of nut or compressive fastener. The reader will appreciate that a variety of nut types exist and could be used in place of the nut shown in the figures. In addition to the types of nuts existing currently, it is contemplated that the tube notching devices described herein could incorporate new types of nuts developed in the future.

Cutting Assembly

Cutting assembly 107 functions to support cutting mechanism 108. Cutting assembly 107 also cooperates with positioning assembly 106 to pivotally and translationally link cutting assembly 107 and positioning assembly 106 together. The reader can see in FIGS. 1-4 that cutting assembly 107 is pivotally mounted to positioning assembly 106. As depicted in FIGS. 1 and 4, cutting assembly 107 is also translationally mounted to positioning assembly 106. With reference to FIGS. 1 and 4, cutting assembly 107 includes a cutting frame 128 and a cutting assembly pivot 129.

The cutting assembly may be any currently known or later developed type of cutting assembly. The shape of the cutting assembly may be adapted to be different than the specific examples shown in the figures to suit a given application. For example, the cutting assembly may include a face having the shape of a regular or irregular polygon, such as a circle, oval, triangle, square, rectangle pentagon, and the like. Additionally or alternatively, the cutting assembly may include a face having an irregular shape. In three dimensions, the shape of the cutting assembly may be a sphere, a pyramid, a cone, a cube, and variations thereof, such as a hemisphere or a frusto-conical shape.

In the present example cutting assembly 107 is composed of metal. However, the cutting assembly may be composed of any currently known or later developed material suitable for the applications described herein for which it is used. Suitable materials include metals, polymers, ceramics, wood, and composite materials.

The size of the cutting assembly may be varied as needed for a given application. In some examples, the cutting assembly is larger relative to the other components than depicted in the figures. In other examples, the cutting assembly is smaller relative to the other components than depicted in the figures. Further, the readers should understand that the cutting assembly and the other components may all be larger or smaller than described herein while maintaining their relative proportions.

Cutting Frame

Cutting frame 128 functions to support cutting mechanism 108 and to movingly couple cutting mechanism 108 to positioning assembly 106. As shown in FIGS. 1-4, cutting frame 128 includes a shoulder member 130 and an arm 131 and a second arm 160.

In the present example, cutting frame 128 is composed of metal. However, the cutting frame may be composed of any currently known or later developed material suitable for the applications described herein for which it is used. Suitable materials include metals, polymers, ceramics, wood, and composite materials.

The size of the cutting frame may be varied as needed for a given application. In some examples, the cutting frame is larger relative to the other components than depicted in the figures. In other examples, the cutting frame is smaller relative to the other components than depicted in the figures. Further, the readers should understand that the cutting frame and the other components may all be larger or smaller than described herein while maintaining their relative proportions.

The shape of the cutting frame may be adapted to be different than the specific examples shown in the figures to suit a given application. For example, the cutting frame may include a face having the shape of a regular or irregular polygon, such as a circle, oval, triangle, square, rectangle pentagon, and the like. Additionally or alternatively, the cutting frame may include a face having an irregular shape. In three dimensions, the shape of the cutting frame may be a sphere, a pyramid, a cone, a cube, and variations thereof, such as a hemisphere or a frusto-conical shape.

The cutting frame may be any currently known or later developed type of frame. The reader will appreciate that a variety of frame types exist and could be used in place of the cutting frame shown in the figures. In addition to the types of frames existing currently, it is contemplated that the tube notching devices described herein could incorporate new types of frames developed in the future.

Arms

The reader can see in FIGS. 1-3 that arm 131 extends from shoulder member 130. With continued reference to FIGS. 1-3, a second arm 160 also extends from shoulder member 130. Second arm 160 is disposed on an opposite end of arm 131 and is configured similarly to arm 131.

As depicted in FIGS. 1 and 4, arm 131 defines a first longitudinal arm channel 152. In the present example, first longitudinal arm channel 152 defines a t-shaped channel. However, the shape and type of the channel may be any currently known or later developed shape and type of channel.

As can be seen in FIG. 1, second arm 160 defines a pair of longitudinal channels; namely, second longitudinal arm channel 170 and third longitudinal arm channel 172. Second longitudinal arm channel 170 is configured similarly and functions similarly to first longitudinal arm channel 152. Third longitudinal arm channel 172 provides an additional or alternative means for controlling translation between cutting frame 128 and positioning assembly 106.

Cutting Assembly Pivot

Cutting assembly pivot 129 serves to pivotally and translationally couple cutting assembly 107 to positioning assembly 106. Cutting assembly pivot 129 includes a cutting assembly pivot shaft 132, a first boss 135, and a second boss 136. Cutting assembly pivot 129 is complementarily configured with longitudinal arm channel 152 and longitudinal pivot plate channel 150.

With reference to FIGS. 1 and 4, cutting assembly pivot 129 is pivotally mounted to cutting frame 128 and to positioning assembly 106. Further, as shown in FIGS. 1 and 4, cutting assembly pivot 129 is pivotally and translationally mounted to arm 131 of cutting assembly 107.

Cutting Assembly Pivot Shaft

Cutting assembly pivot shaft 132 functions to movingly tie positioning assembly 106 and cutting assembly together. With reference to FIGS. 1-3, cutting assembly pivot shaft 132 extends through longitudinal arm channel 152 and longitudinal pivot plate channel 150 of positioning assembly 106. The reader can see in FIGS. 1 and 4 that cutting assembly pivot shaft 132 is slidingly mounted within longitudinal arm channel 152.

As depicted in FIGS. 1-3, cutting assembly pivot shaft 132 includes a first end 133 and a second end 134. As shown in FIGS. 2-4, first end 133 extends beyond arm 131 distal first pivot plate 115. The reader can see in FIGS. 1-3 that second end 134 extends beyond first pivot plate 115 distal arm 131.

As shown in FIGS. 1-4, cutting assembly pivot shaft 132 is a T-slot bolt. However, the cutting assembly pivot shaft may be any currently known or later developed type of shaft. The reader will appreciate that a variety of shaft types exist and could be used in place of the shaft or bolt shown in the figures. In addition to the types of shafts existing currently, it is contemplated that the tube notching device described herein could incorporate new types of shafts or bolts developed in the future.

Bosses

First boss 135 and second boss 136 function to restrict cutting assembly pivot shaft 132 from pulling out of longitudinal arm channel 152 and longitudinal pivot plate channel 150.

First boss 135 is disposed on first end 133 of cutting assembly pivot shaft 132. First boss 135 restricts cutting assembly pivot shaft 132 from passing through longitudinal arm channel 152. In the present example, first boss 135 is a head of pivot shaft 132.

Second boss 136 is disposed on second end 134 of cutting assembly pivot shaft 132. Second boss 136 restricts cutting assembly pivot shaft 132 from passing through longitudinal pivot plate channel 150. In the example shown in FIGS. 1-4, second boss 136 is a nut 162 threadingly mated to pivot shaft 132. Selectively tightening nut 162 restricts arm 131 from pivoting and translating relative to first pivot plate 115.

Cutting Mechanism

Cutting mechanism 108 functions to form notches in workpieces. In the present examples, cutting mechanism 108 is configured to form a notch 101 in tubular workpiece 102 by pushing or translating cutting mechanism 108 into tubular workpiece 102. Cutting mechanism 108 translates into tubular workpiece 102 to form a desired notch 110 when cutting mechanism 108 is in desired notching position 109 and tubular workpiece 102 is in desired support position 105.

With reference to FIGS. 1 and 2, the reader can see that cutting mechanism 108 is mounted to cutting assembly 107. The reader can see in FIGS. 1 and 2 that cutting mechanism 108 is translationally mounted to cutting assembly 107. Cutting mechanism 108 being translationally mounted enables cutting mechanism 108 to translate transverse to a longitudinal axis of tubular workpiece 102 secured in vise 104. Cutting mechanism 108 is configured to be selectively secured in a desired position 139 relative to the longitudinal axis of tubular workpiece 102.

In the present example, cutting mechanism 108 includes a shaft 180, a bearing block 181, and a hole saw blade 182. Shaft 180 is configured to be driven by a drill or other rotary driver. Additionally or alternatively to hole saw blades, the cutting mechanism may include other circular cutting tools.

The cutting mechanism may be any currently known or later developed type of cutting mechanism. The reader will appreciate that a variety of cutting mechanism types exist and could be used in place of the cutting mechanism shown in the figures. In addition to the types of cutting mechanisms existing currently, it is contemplated that the tube notching devices described herein could incorporate new types of cutting mechanisms developed in the future.

The size of the cutting mechanism may be varied as needed for a given application. In some examples, the cutting mechanism is larger relative to the other components than depicted in the figures. In other examples, the cutting mechanism is smaller relative to the other components than depicted in the figures. Further, the readers should understand that the cutting mechanism and the other components may all be larger or smaller than described herein while maintaining their relative proportions.

In the present example cutting mechanism 108 is composed of metal. However, the cutting mechanism may be composed of any currently known or later developed material suitable for the applications described herein for which it is used.

Additional Embodiments

With reference to the figures not yet discussed, the discussion will now focus on additional tube notching device embodiments. The additional embodiments include many similar or identical features to tube notching device 100. Thus, for the sake of brevity, each feature of the additional embodiments below will not be redundantly explained. Rather, key distinctions between the additional embodiments and tube notching device 100 will be described in detail and the reader should reference the discussion above for features substantially similar between the different tube notching device examples.

Second Embodiment

Figure 5:
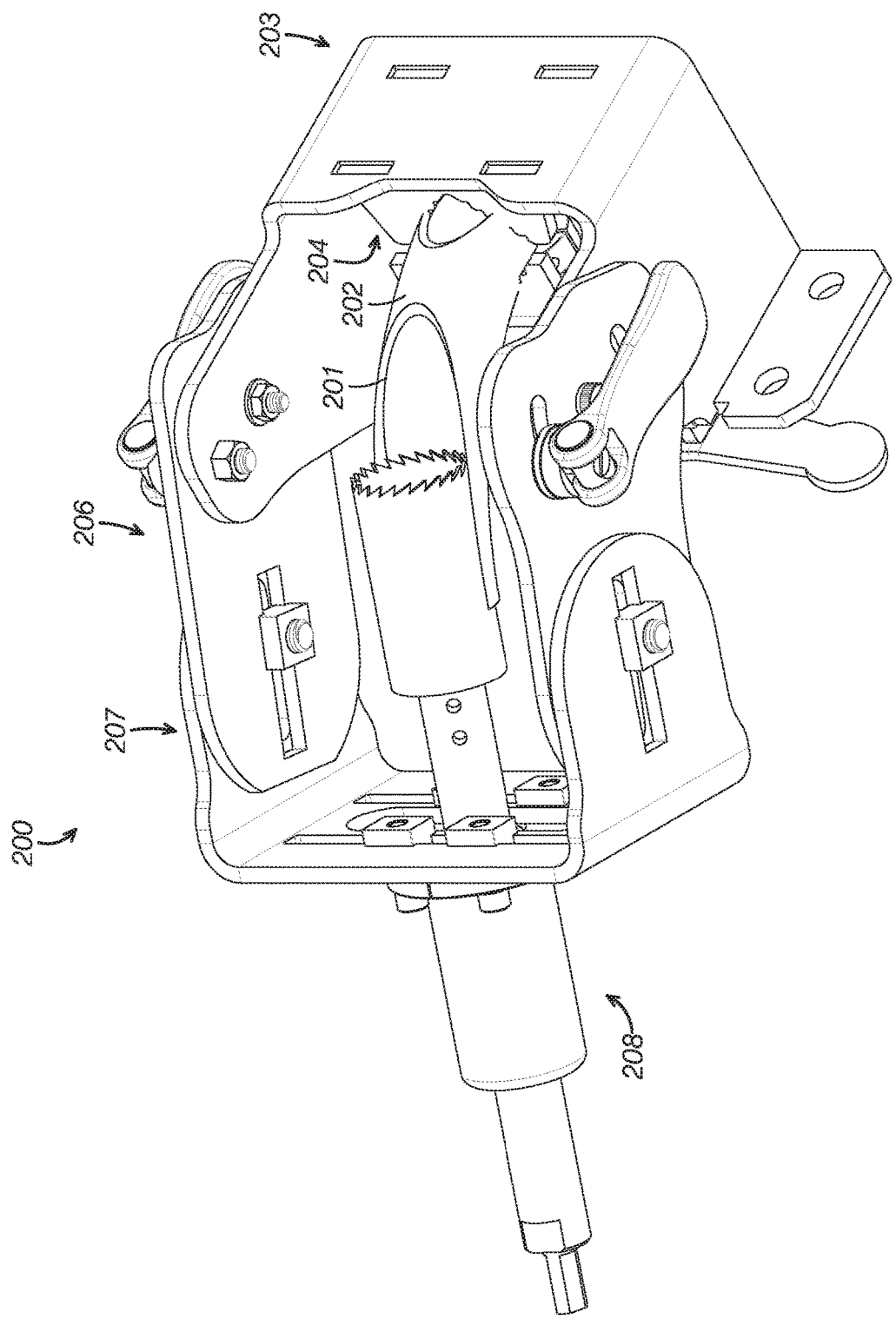
FIG. 5 is a perspective view of a second embodiment of a tube notching device forming a notch in a tubular workpiece.
Figure 6:
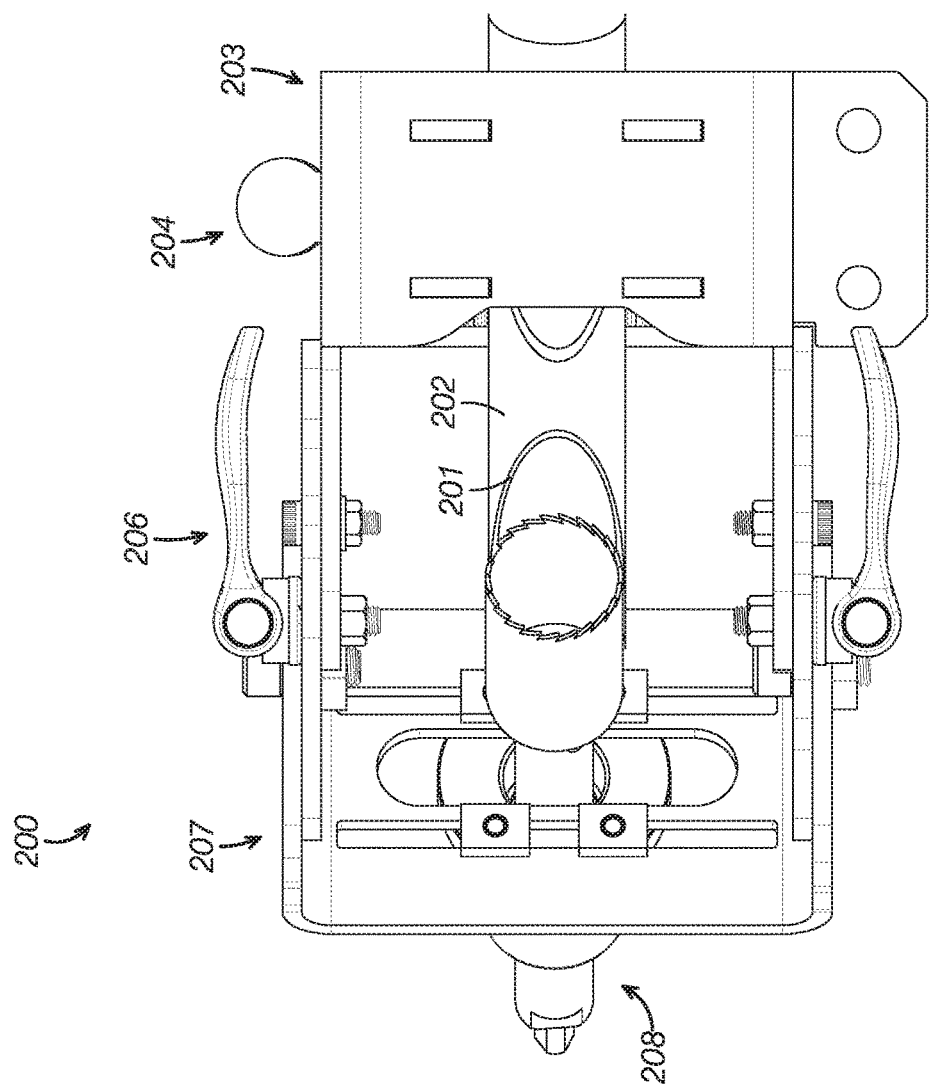
FIG. 6 is a front elevation view of the tube notching device shown in FIG. 5.
Figure 7:
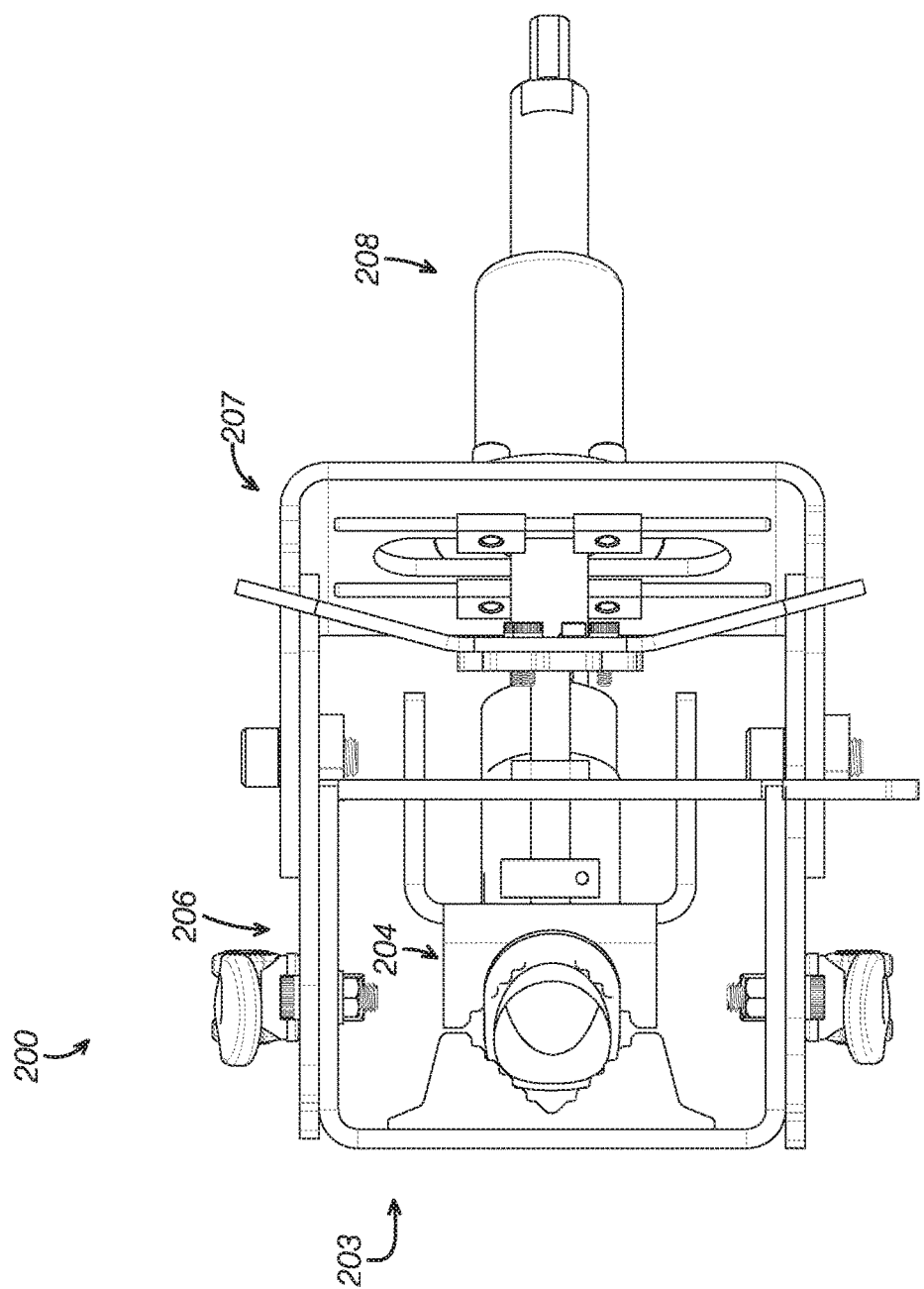
FIG. 7 is a rear elevation view of the tube notching device shown in FIG. 5.

Turning attention to FIGS. 5-7, a tube notching device 200 will now be described as a second embodiment. As can be seen in FIGS. 5-7, tube notching device 200 includes a support frame 203, a vise 204, a positioning assembly 206, a cutting assembly 207, and a cutting mechanism 208.

A distinction between tube notching device 200 and tube notching device 100 is that tube notching device 200 does not include a third longitudinal arm channel like tube notching device 100 includes third longitudinal arm channel 172. A third longitudinal arm channel is an optional feature not utilized by tube notching device 200.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A tube notching device for forming a notch in a tubular workpiece, comprising:
   a support frame;
   a vise mounted to the support frame and configured to selectively secure the tubular-workpiece in a desired support position;
   a positioning assembly pivotally mounted to the support frame;
   a cutting assembly pivotally and translationally mounted to the positioning assembly, the cutting assembly including:
     a cutting frame having a shoulder member and an arm extending from the shoulder member, and
     a cutting assembly pivot pivotally mounted to the cutting frame and pivotally and translationally mounted to the arm;

a cutting mechanism mounted to the cutting assembly, the cutting mechanism configured to form the notch in the tubular workpiece;

wherein the positioning assembly and the cutting assembly cooperate to position the cutting mechanism in a desired notching position relative to the tubular workpiece supported in the vise in the desired support position;

wherein the cutting mechanism operates to form the notch in the tubular workpiece when the cutting mechanism is in the desired notching position and the tubular workpiece is in the desired support position.

2. The tube notching device of claim 1, wherein the positioning assembly includes:
a first pivot pivotally coupling the positioning assembly to the support frame; and
a second pivot pivotally coupling the positioning assembly to the support frame.

3. The tube notching device of claim 2, wherein:
the first pivot is disposed on a first side of the vise; and
the second pivot is disposed on a second side of the vise, the second side opposite the first side of the vise.

4. The tube notching device of claim 1, wherein:
the arm defines a longitudinal arm channel; and
the cutting assembly pivot is slidingly mounted within the longitudinal arm channel.

5. The tube notching device of claim 4, wherein:
the positioning assembly includes a first pivot plate;
the first pivot plate defines a longitudinal pivot plate channel complementarily configured with the longitudinal arm channel;
the cutting assembly pivot extends through the longitudinal arm channel and the longitudinal pivot plate channel; and
the cutting assembly pivot includes:
a cutting assembly pivot shaft having:
a first end extending beyond the arm distal the first pivot plate; and
a second end extending beyond the first pivot plate distal the arm;
a first boss disposed on the first end of the cutting assembly pivot shaft, the first boss restricting the cutting assembly pivot from passing through the longitudinal arm channel; and
a second boss disposed on the second end of the cutting assembly pivot shaft, the second boss restricting the cutting assembly pivot from passing through the longitudinal pivot plate channel.

6. The tube notching device of claim 5, wherein:
the cutting assembly pivot shaft is a bolt;
the first boss is a head of the bolt;
the second boss is a nut threadingly mated to the bolt, and selectively tightening the nut restricts the arm from pivoting and translating relative to the first pivot plate.

7. The tube notching device of claim 5, wherein the longitudinal arm channel has a lateral dimension that is narrower than a corresponding dimension of a head of the first boss.

8. A tube notching device for forming a notch in a tubular workpiece, comprising:
a support frame;
a vise mounted to the support frame and configured to selectively secure the tubular workpiece in a desired support position;
a positioning assembly pivotally mounted to the support frame, the positioning assembly including:
a first pivot pivotally coupling the positioning assembly to the support frame;
a first pivot plate defining:
a curved channel extending partially around the first pivot, the curved channel extending through the first pivot plate, and
a longitudinal pivot plate channel spaced from the curved channel; and
a first pivot lock mechanism slidingly mounted within the curved channel, the first pivot lock mechanism being configured to selectively restrict the first pivot plate from pivoting relative to the support frame around the first pivot;
a cutting assembly pivotally and translationally mounted to the positioning assembly, the cutting assembly including:
a cutting frame defining a longitudinal arm channel complementarily configured with the longitudinal pivot plate channel and overlying the longitudinal pivot plate channel; and
a cutting assembly pivot pivotally and translationally mounted to the cutting frame by extending through the longitudinal arm channel and the longitudinal pivot plate channel and selectively fixing a relative pivotal and translational position of the cutting frame and the first pivot plate;
a cutting mechanism mounted to the cutting assembly, the cutting mechanism configured to form the notch in the tubular workpiece;
wherein the positioning assembly and the cutting assembly cooperate to position the cutting mechanism in a desired notching position relative to the tubular workpiece supported in the vise in the desired support position;
wherein the cutting mechanism operates to form the notch in the tubular workpiece when the cutting mechanism is in the desired notching position and the tubular workpiece is in the desired support position.

9. The notching device of claim 8, wherein the cutting mechanism is translationally mounted to the cutting assembly.

10. A tube notching device for forming a notch in a tubular workpiece, comprising:
a support frame;
a vise mounted to the support frame and configured to selectively secure the tubular workpiece in a desired support position;
a positioning assembly pivotally mounted to the support frame and including:
a first pivot plate defining a curved channel;
a first pivot pivotally coupling the positioning assembly and the first pivot plate to the support frame;
a second pivot pivotally coupling the positioning assembly to the support frame;
a first pivot lock mechanism slidingly mounted within the curved channel and configured to selectively restrict the first pivot plate from pivoting relative to the support frame around the first pivot;
a cutting assembly pivotally mounted to the positioning assembly;
a cutting mechanism mounted to the cutting assembly, the cutting mechanism configured to the form the notch in the tubular workpiece;
wherein the positioning assembly and the cutting assembly cooperate to position the cutting mechanism in a desired notching position relative to the tubular workpiece supported in the vise in the desired support position;

wherein the cutting mechanism operates to form the notch in the tubular workpiece when the cutting mechanism is in the desired notching position and the tubular workpiece is in the desired support position;

wherein the curved channel extends partially around the first pivot.

11. The tube notching device of claim 10, wherein:

the support frame includes a first port configured to receive the first pivot lock mechanism;

the first pivot lock mechanism includes:
- a shaft extending through the curved channel and the first port of the support frame; and
- a restriction member supported on the shaft and selectively operable to restrict the shaft from sliding in the curved channel.

12. The tube notching device of claim 11, wherein:

the shaft is fixed to the support frame; and the restriction member includes a cam configured to pull the shaft in a direction that compresses the support frame against the first pivot plate to restrict the first pivot plate from pivoting relative to the support frame by frictional engagement between the support frame and the first pivot plate.

13. The tube notching device of claim 12, wherein the first pivot lock mechanism further includes a nut restricting the shaft from pulling out of the first port of the support frame.

14. The tube notching device of claim 12, wherein the restriction member and the shaft collectively define a first cam lock.

15. The tube notching device of claim 10, wherein:

the positioning assembly includes a second pivot plate disposed on a second side of the vise;

the second pivot pivotally couples the second pivot plate to the support frame; and the positioning assembly includes a second pivot lock mechanism configured to selectively restrict the second pivot plate from pivoting relative to the support frame around the second pivot.

16. The tube notching device of claim 15, wherein the second pivot lock mechanism is a cam lock.

* * * * *